United States Patent [19]

Meredith et al.

[11] Patent Number: 4,957,831

[45] Date of Patent: Sep. 18, 1990

[54] CONTROL APPARATUS FOR SWITCHING A BATTERY PACK

[75] Inventors: Daryl S. Meredith, Cockeysville; Scott D. Price, Pylesville, both of Md.

[73] Assignee: Black & Decker, Inc., Newark, Del.

[21] Appl. No.: 285,296

[22] Filed: Dec. 15, 1988

Related U.S. Application Data

[63] Continuation of Ser. No. 164,436, Mar. 4, 1988, abandoned.

[51] Int. Cl.$^5$ .............................................. H01M 2/00
[52] U.S. Cl. ..................................... 429/121; 429/97; 429/150; 439/166; 439/500; 307/150
[58] Field of Search ............................... 429/121-123, 429/97, 150; 439/500, 166, 167, 170, 171, 174; 307/150; 320/2

[56] References Cited

U.S. PATENT DOCUMENTS

| | | | |
|---|---|---|---|
| 3,053,991 | 9/1962 | Sturman | 307/150 X |
| 3,120,985 | 2/1964 | Hubbell | 439/166 |
| 3,308,419 | 3/1967 | Rohowetz et al. | 307/150 X |
| 3,939,362 | 2/1976 | Grimes et al. | 307/150 |
| 4,399,201 | 8/1983 | Nagahara | 429/97 X |
| 4,493,880 | 1/1985 | Lund | 429/97 |
| 4,581,570 | 4/1986 | Mejia | 320/2 |

FOREIGN PATENT DOCUMENTS

| | | |
|---|---|---|
| 507400 | 12/1951 | Belgium . |
| 0135409 | 3/1985 | European Pat. Off. . |
| 639852 | 12/1936 | Fed. Rep. of Germany . |
| 757831 | 1/1934 | France . |
| 1548081 | 11/1968 | France . |
| 55-130079 | 10/1980 | Japan . |
| 984191 | 2/1965 | United Kingdom . |
| 1445055 | 8/1976 | United Kingdom . |
| 2108334 | 5/1983 | United Kingdom . |

OTHER PUBLICATIONS

IBM Technical Disclosure Bulletin, vol. 27, No. 3, pp. 1726–1727, entitled "Voltage Selector Assembly", Joy et al., published Aug. 1984.

*Primary Examiner*—Anthony Skapars
*Attorney, Agent, or Firm*—Finnegan, Henderson, Farabow, Garrett & Dunner

[57] ABSTRACT

A control apparatus for a battery pack having two power receptacles coupled to an electric circuit that includes a switch for selectively delivering power to the receptacles. The control apparatus includes (1) a structure for retaining the receptacles a predetermined distance apart; (2) a cover moveable on the retaining structure so as to selectively expose a selected one of the receptacles while simultaneously covering the nonselected one; and (3) a protuberance coupled to the cover for engaging the switch and translating movement of the cover into operable movement of the switch.

8 Claims, 1 Drawing Sheet

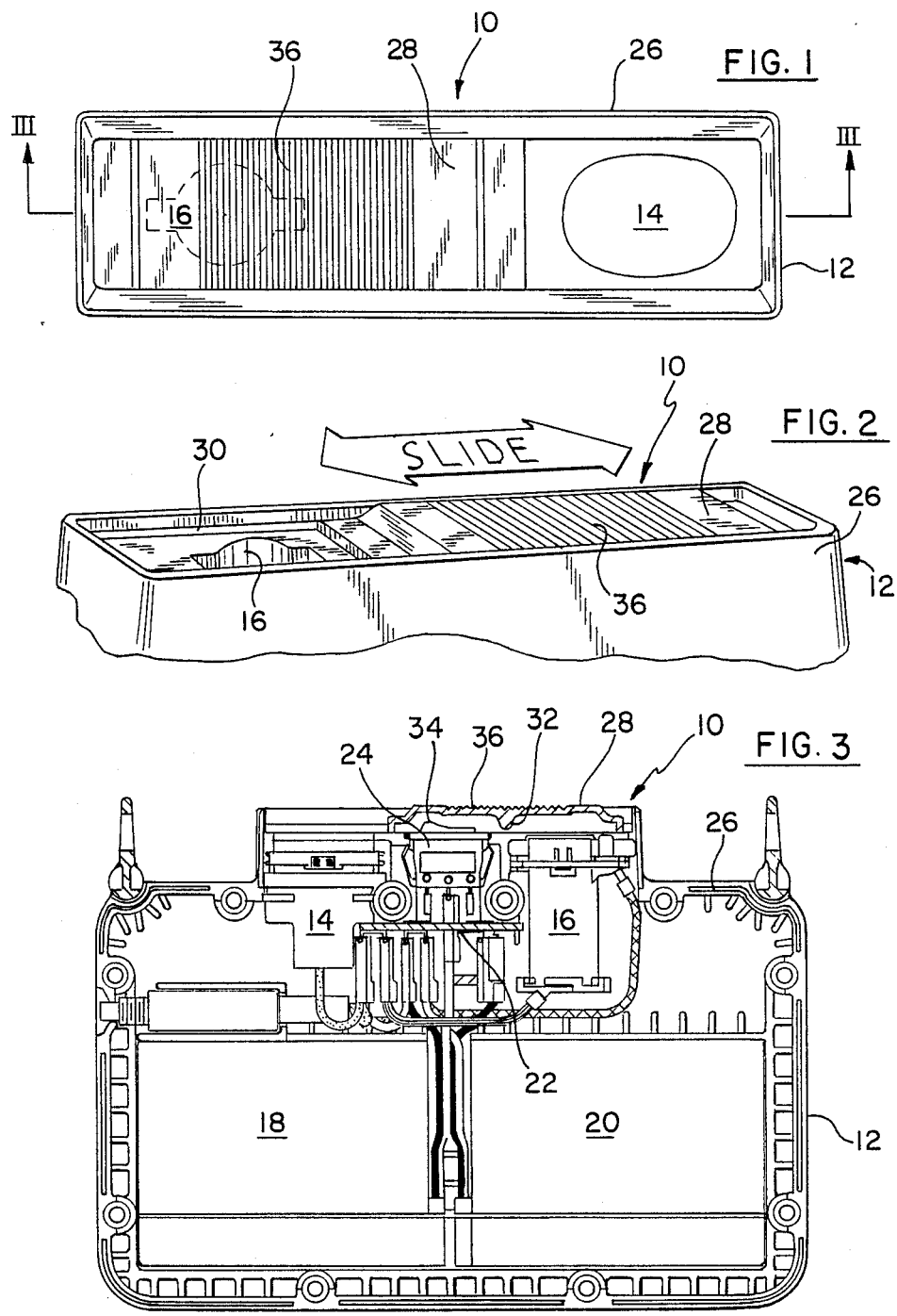

CONTROL APPARATUS FOR SWITCHING A BATTERY PACK

This application is a continuation of application Ser. No. 07/164,436, filed Mar. 4, 1988, now abandoned.

BACKGROUND OF THE INVENTION

The present invention relates to a sliding switch plate for selecting between two power receptacles and the application of power thereto. The invention further relates to a sliding cover for use with a portable battery pack in which accessibility and power to one of two different receptacles is controlled by movement of the cover.

Battery packs capable of delivering power to devices having differing power demands are well known. Such battery packs typically comprise a plurality of storage batteries, such as the lead acid type, and an electrical circuit for configuring the interconnection of the batteries so as to deliver the desired power. For example, battery packs can be configured to deliver either 12 VDC power or 24 VDC power in order to selectively power devices at either level.

In such battery packs, different receptacles are typically provided for each different voltage level that the pack is capable of delivering. In the above example, one receptacle may be provided to which devices intended to receive 12 VDC can be coupled, whereas a different receptacle would be provided for connection to devices intended to receive 24 VDC. Suitable receptacles for this purpose are known in the art and typically have a unique configuration so that a device intended to receive 12 VDC can have a plug that uniquely mates to the 12 VDC receptacle while devices intended to receive 24 VDC have a plug uniquely adapted to fit only the-corresponding 24 VDC receptacle. In this manner, delivery of the proper voltage level is usually assured.

There are occasions, however, when even disparities in the physical dimensions of the receptacles are not sufficient to prevent a device from being plugged into the wrong receptacle. The operator may physically force the plug into the wrong receptacle or the device may have been rewired with a plug of the wrong size. In such instances, applying the incorrect voltage level could result in damage to either the device or battery pack or both. A need thus exists for providing safeguards to prevent incorrect connection of a device to be powered to the wrong power receptacle.

A further problem in using such multi-voltage battery packs relates to the need for internally switching to the correct power level. In the foregoing example, circuitry within the battery pack is typically provided so as to selectively configure the batteries to deliver the desired 12 VDC or 24 VDC. Such circuitry generally includes a switch that must be appropriately manipulated by the operator in order to select the desired voltage output. Even if the device is plugged into the appropriate power receptacle, failure to manually adjust such a switch may still cause damage to the device or to the battery pack. For example, the battery pack may deliver the wrong voltage level if not switched properly so that the device receives the incorrect voltage or the pack is subjected to excessive current demands.

Another problem presented by a battery pack having two receptacles is the possibility that devices will be plugged into both receptacles at the same time. This may result in excessive drain on the battery pack and, in those battery packs having internal fuses or circuit breakers, undesirable tripping of the circuit-protecting device may occur. This problem gives rise to a need for making only one receptacle available for use at a time, thereby avoiding possible use of both receptacles at the same time.

A need therefore exists for suitably controlling the circuitry within the battery pack so as to ensure appropriate selection of the voltage level corresponding to the chosen receptacle.

SUMMARY OF THE INVENTION

It is therefore an object of the present invention to provide a battery pack having at least two receptacles for delivering different voltages, with physical access being limited to one receptacle at a time.

A further object of the invention is to provide a battery pack having internal circuitry including a switch for selecting between voltage levels being delivered to the power receptacles, with setting of the switch occurring automatically in connection with exposing for use the corresponding receptacle.

Additional objects and advantages of the invention will be set forth in part in the description which follows, and in part will be obvious from the description or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the invention includes a control apparatus for rendering operable a selected one of two power receptacles, the receptacles being coupled to an electric circuit that includes a switch for selectively delivering power to the receptacles, comprising: means for retaining the receptacles a predetermined distance apart; a cover moveable on the retaining means so as to selectively expose the selected one of the two power receptacles while simultaneously covering the nonselected one of the receptacles; and means coupling the cover to the switch for translating the sliding movement of the cover into operable movement of the switch.

The accompanying drawings, which are incorporated in and constitute part of this specification, illustrates one embodiment of the invention and, together with the following description, serve to explain the principles of the invention.

DESCRIPTION OF THE DRAWINGS

FIG. 1 is a top plan fragmentary view of a battery pack having a sliding cover and receptacles in accordance with the present invention;

FIG. 2 is a top perspective view of the sliding cover of FIG. 1; and

FIG. 3 is a cross-sectional view of the battery pack, including sliding cover and receptacles, shown in FIG. 1 and taken along line III—III of FIG. 1.

DESCRIPTION OF THE PREFERRED EMBODIMENT

Reference will now be made in detail to the presently preferred embodiment of the invention, an example of which is illustrated in the accompanying drawings. Throughout the drawings, like reference characters are used to designate like elements.

For convenience, reference will be made simultaneously to FIGS. 1 and 2 which show various details of the present invention in top plan and perspective views, respectfully. The present invention concerns a control assembly 10 for use with a portable battery pack 12 capable of delivering power at selected levels. Such levels may, by way of example and without limitation, correspond to 12 VDC and 24 VDC. To permit coupling of these power output levels to a desired device (not shown), corresponding receptacles 14 and 16 are provided.

Receptacles 14 and 16 are each intended to deliver only one of the various power outputs which battery pack 12 is capable of providing. For example, receptacle 14 can deliver the 24 VDC output and receptacle 16 can deliver the 12 VDC output. In an effort to avoid connecting the device to be powered (not shown) to the wrong receptacle, these receptacles 14 and 16 can be provided with a unique shape that permits the device being powered to be plugged into only one of the two receptacles. Such receptacles are well known and need not be described further for purposes of understanding the present invention. As shown best in FIG. 1, receptacle 14 may have an oval shape whereas receptacle 16 may have a more rounded shape with two keyed sections; however, other configurations or even identically shaped receptacles can be employed without departing from the spirit or scope of the present invention.

To select between delivery of power at different levels to receptacles 14 and 16, battery pack 12 includes an electric circuit that has a switch for selectively delivering power to the receptacles. These internal details of the battery pack are best shown in FIG. 3, and will only be discussed in general since circuitry suitable for controlling battery packs in the described manner are well known in the art. As illustrated in FIG. 3 for exemplary purposes, battery pack 12 includes a pair of storage batteries 18, 20 coupled via suitable wiring to a circuit board 22 on which may be disposed the electrical components comprising the aforementioned electric circuit. Also connected to the circuit on board 22 is a switch 24 which, as illustrated in FIG. 3, may be a rocker switch moveable between two positions. Receptacles 14 and 16 are also connected to circuit board 22 via suitable wires.

A battery pack 12 having the elements identified above is well known in the art and is not described here for purposes of brevity. In operation, switch 24 is moved to one of its two positions which causes the circuit on board 22 to suitably interconnect batteries 18, 20 so that the desired power level is delivered to receptacles 14, 16. In the example of a 12/24 VDC battery pack, for instances, batteries 18, 20 may each be a lead acid battery capable of delivering 12 VDC. Movement of switch 24 to one position connects the batteries in parallel so that 12 VDC is delivered to the receptacles. Movement of switch 24 to its other position connects the batteries in series so that 24 VDC is delivered to the receptacles. It should be appreciated that other configurations, voltage levels, receptacles, etc. can be employed without departing from the spirit or scope of the present invention.

Receptacles 14, 16 are typically connected in parallel so that both simultaneously receive the voltage intended for delivery to the device that is to be operated. Because a voltage output is available at both receptacles, the need exists for safeguards to ensure that the device is connected to the appropriate receptacle and power at the intended level is delivered to the device. Accordingly, the present invention provides a failsafe control apparatus for exposing only one receptacle while simultaneously switching the battery pack so as to deliver the corresponding voltage level.

According to the present invention, means are provided for retaining the receptacles a predetermined distance apart. As embodied herein, these retaining means comprise the battery pack outer casing 26 to which receptacles 14 and 16 are fixedly secured. Connection of receptacles 14, 16 to casing 26 can be accomplished by hardware, such as screws or mounting brackets, or other convenient arrangements, such as glueing, molding of the casing, etc. By virtue of the retaining means 26, receptacles 14 and 16 are fixedly mounted and kept a selected distance apart, as illustrated in FIGS. 1–3.

Also according to the invention, a cover is provided moveable on said retaining means so as to selectively expose the selected one of the two power receptacles while simultaneously covering the nonselected one of the receptacles. As shown in the drawings, the cover is designated by reference character 28 and is slideably moveable relative to casing 26 so as to selectively cover one receptacle while uncovering the other. FIG. 1, for instance, shows cover 28 in a position wherein receptacle 14 is uncovered while receptacle 16 is simultaneously covered. In another position, as shown in FIGS. 2–3, cover 28 can uncover receptacle 16 while simultaneously covering receptacle 14. In this fashion, only one of receptacles 14 and 16 is available for use at a time due to the imposition of cover 28 over the unselected receptacle.

Movement of cover 28 on battery casing 26 may be accomplished by a variety of arrangements, a presently preferred one being illustrated in the accompanying drawings As best shown in FIG. 2, casing 26 may include an opening in the vicinity of receptacles 14, 16 that is shaped in a fashion corresponding to that of cover 28. In this arrangement, casing 26 has an internal raceway 30 into which the opposing edges 31 (only one shown in FIG. 2) of cover 28 are fitted. Cover 28 can thereby slideably move back and forth within the raceway 30 of casing 26 so as to selectively cover and uncover receptacles 14, 16.

Other arrangements for providing the aforedescribed slideable movement of cover 28 can be employed without departing from the spirit or scope of this invention. For example, cover 28 may be provided with a pivot whereby movement of the cover relative to the pivot selectively covers and uncovers the receptacles.

Also according to the invention, means are provided coupling the cover to the switch for translating the sliding movement of the cover into operable movement of the switch. As embodied herein, the translating means are depicted in FIG. 3 as a nub 32 protruding from the underside of moveable cover 28. Nub 32 is disposed so as to engage a rocker portion 34 of switch 24 as cover 28 travels from one operating position to its other operating position. As the cover moves, nub 32 engages rocker portion 34 so that switch 24 is switched from one position to its other position, thereby suitably causing the circuit on board 22 to apply the desired power level to receptacles 14, 16.

Operation of the subject control apparatus can therefore be appreciated as involving movement of cover 28 relative to casing 26 so as to uncover one receptacle while covering the other receptacle. As shown in FIG. 1, cover 28 is covering receptacle 16 while uncovering receptacle 14; FIGS. 2–3 depict the cover 28 as having been moved so as to cover receptacle 14 while uncovering receptacle 16. During this sliding movement, nub 32 on the underside of cover 28 engages the rocker portion 34 of switch 24 so as to move the switch into the appropriate operating position. That is, switch 24 is operably moved so that the battery pack circuit causes the appropriate voltage level to be applied to and available at the receptacles, only one of which is uncovered. In this fashion, erroneous and possibly damaging operation of the battery pack is avoided because only one receptacle is exposed at a time and the internal circuitry of the pack correspondingly controls availability of the correct output at the uncovered receptacle.

According to a presently preferred embodiment, casing 26 and cover 28 may be formed of a plastic material, such as an ABS resin, although other materials could also be used. A plastic material is especially useful since it affords convenient formation and assembly of raceway 30 of casing 26 to provide the desired sliding movement of cover 28. As shown in the drawings, cover 28 can have a knurled or grooved portion 36 to facilitate easy manipulation by the operator's fingers. Suitable labeling of the different positions of cover 28 and receptacles 14, 16 may also be provided.

While FIG. 3 illustratively depicts the translating means as comprising an integral nub 32, it should be understood that other arrangements can be employed without departing from the spirit or scope of the invention. The particular arrangement will depend upon the nature of switch 24, especially the configuration of the exposed surface of rocker portion 34. Selection of a suitable translating means and corresponding switch is believed to be obvious in light of the teachings of the invention, as set forth herein. For example, a pushbutton could be employed for switch 24, with nub 32 configured to engage and hence "push" the actuating portion of the pushbutton each time cover 28 is slid from one position to the other.

It is further to be appreciated that the present invention may find applications for controlling devices other than the battery pack illustratively described and shown here. In particular, the inventive control apparatus can be employed in other situations in which selective connections are to be made simultaneously with appropriate switching of internal electrical circuitry relating to those connections. The present invention thus more broadly concerns a failsafe arrangement allowing for controlled access to electrical apparatus and concurrent switching of internal circuitry.

Other embodiments of the invention will be apparent to those skilled in the art from consideration of the specification and practice of the invention disclosed herein. Thus, it is intended that the specification and drawing be considered as exemplary only, with the true scope and spirit of the invention being indicated by the following claims.

What we claim is:

1. A control apparatus for rendering operable a selected one of two power receptacles, the receptacles being coupled to an electric circuit that includes a switch for selectively delivering power to the receptacles, comprising:
    means for retaining the receptacles a predetermined distance apart;
    a cover moveable on said retaining means along a line intersecting both of said power receptacles so as to selectively expose the selected one of the two power receptacles while simultaneously covering the nonselected one of the receptacles; and
    means, coupling said cover to the switch, for translating the movement of said cover into operable movement of the switch.

2. The control apparatus recited in claim 1, wherein said power receptacles, electric circuit and switch comprise components of a battery pack, and said retaining means comprise a casing for said battery pack to which said receptacles are coupled.

3. The control apparatus recited in claim 2, wherein said battery pack casing includes a raceway and said cover has edges fitted into said raceway for providing slideable movement of said cover relative to said power receptacles.

4. The control apparatus recited in claim 1, wherein said cover is slideably moveable on said retaining means.

5. The control apparatus recited in claim 1, wherein said translating means comprises a protuberance on said cover arranged to engage said switch during movement of said cover.

6. The control apparatus recited in claim 5, wherein said protuberance is integrally formed with said cover.

7. A battery pack for delivering different output levels to at least two power receptacles, including a plurality of batteries and an electric circuit having a switch for controlling delivery of power from the batteries to the receptacles, the battery pack further comprising:
    means for retaining the receptacles a predetermined distance apart;
    a cover moveable on said retaining means along a line intersecting both of said power receptacles so as to selectively expose a selected one of the two power receptacles while simultaneously covering the nonselected one of the receptacles; and
    means, coupling said cover to the switch, for translating the movement of said cover into operable movement of the switch.

8. The battery pack recited in claim 7, wherein said coupling means permits sliding movement of said cover relative to the receptacles.

* * * * *